United States Patent [19]

Suzuki

[11] Patent Number: 4,571,584
[45] Date of Patent: Feb. 18, 1986

[54] LIQUID CRYSTAL IMAGE DISPLAY SYSTEM

[75] Inventor: Yoshio Suzuki, Tokyo, Japan
[73] Assignee: Sony Corporation, Tokyo, Japan
[21] Appl. No.: 516,257
[22] Filed: Jul. 22, 1983
[30] Foreign Application Priority Data

Jul. 22, 1982 [JP] Japan .................. 57-127997

[51] Int. Cl.⁴ .................. G09G 3/36; G09G 3/00
[52] U.S. Cl. .................. 340/784; 340/805; 340/811; 307/360
[58] Field of Search .......... 340/784, 802, 805, 811, 340/814; 307/360, 361, 362, 363, 494, 355

[56] References Cited

U.S. PATENT DOCUMENTS

4,006,412  2/1977  Campbell et al. .......... 307/361 X
4,127,848  11/1978  Shanks .................. 340/784
4,270,118  5/1981  Brokaw .................. 307/361 X

*Primary Examiner*—Marshall M. Curtis
*Assistant Examiner*—Vincent P. Kovalick
*Attorney, Agent, or Firm*—Lewis H. Eslinger; Alvin Sinderbrand

[57] ABSTRACT

A liquid crystal display produces a still image derived from a video signal by use of a comparator and selected reference levels to derive the driving signal for the liquid crystal display array. The vertical and horizontal samples and timing pulses derived from the original video signal of the image to be displayed are stored in shift registers, respectively, and then read out into multiplexers for feeding to the liquid crystal display array. The multiplexers are analog gates that have connected thereto in addition to the shift register output signal a plurality of voltages derived from a voltage divider network that sets the level of the voltage applied across each liquid crystal device in the array. No analog-to-digital converter or multiple shift register and specialized switch combination are required and thus the operational margin or sensitivity of the liquid crystal display is not adversely affected and the driving circuit is relatively uncomplicated.

20 Claims, 24 Drawing Figures

| $D_x$ | 1 | 1 | 1 | 0 | 0 | 0 |
|---|---|---|---|---|---|---|
| $D_y$ | 1 | 0 | 0 | 1 | 0 | 0 |

FIG. 5

LIQUID CRYSTAL IMAGE DISPLAY SYSTEM

BACKGROUND OF THE INVENTION

1. Field of the Invention

The present invention relates in general to liquid crystal image display apparatus and, particularly, to a liquid crystal image display for displaying a still black and white image having intermediate gray tones.

2. Description of Prior Art

It has been well known for some time to use liquid crystal displays (LCD) for alpha-numeric indicators in watches, calculators, and the like. In such applications, the liquid crystal display need only provide a black and white representation of the data being displayed. More recently, liquid crystals display have been arranged in much larger arrays and used to produce still pictorial images that are derived in some cases, from a video signal. In order to produce realistic pictorial images, various intermediate gray tones between the black and white are required, these gray tones make up what is commonly known as a gray scale. The typical approach to producing an appropriate gray scale for realistic images is to pulse width modulate the video signal used to drive the liquid crystal display, thereby obtaining the desired intermediate gray tones between black and white.

The presently known approach to achieving the desired gray tones by pulse width modulating a video signal uses an analog-to-digital converter to derive digital gray scale information, and a number of shift registers, in combination with respective multiplexers, are used in both horizontal and vertical directions on the LCD array. The derived digital gray tone signals are applied to the liquid crystal display array in the vertical direction using a shift register and multiplexer and, in the horizontal direction, complicated switching circuitry is required between the shift registers containing the digital values and a multiplexer used to apply the shift register contents to the liquid crystal display array. In regard to these multiplexers, typically one multiplexer has as many stages as the number of picture elements in one horizontal period and, similarly, the other multiplexer has as many stages as the number of scan lines in the vertical direction.

The presently known system prevents a decrease in quality of the crystal due to electrolysis by driving the liquid crystal display with what is essentially an alternating current signal. In the known system, the tone of the LCD is controlled by the effective value of the applied voltage, however, because the driving signals are pulse width modulated the effective frequency of the signals will also vary according to the tone to be reproduced. This adversely affects the so-called operational margin of the liquid crystal, which is another way of referring to the sensitivity or the degree to which a liquid crystal responds to changes in input signal level. Changes in the operational margin of the liquid crystal will prevent a correct tone display from being achieved.

Additionally, the circuit elements and circuit construction required for the analog-to-digital converter used in the above-described system is quite complicated, also, a shift register is required for each bit of the output signal of the analog-to-digital converter. Similarly, in producing the pulse width modulation signal, a plurality of individual switch circuits are required that is equal to the number of picture elements, thereby further increasing the complexity of the circuit.

OBJECTS AND SUMMARY OF THE INVENTION

Accordingly, it is an object of the present invention to provide a liquid crystal display for displaying still pictorial images that has a relatively simple circuit structure and provides a stable operational margin for the liquid crystals.

It is another object of the present invention to provide a liquid crystal display system capable of providing intermediate gray tones and which does not employ an analog-to-digital converter.

In one aspect of the present invention, the input video signal is applied to a comparator to which is also applied a reference signal that varies through several levels in each consecutive one of the plurality of video fields. The drive signals for the liquid crystal display are then formed according to the output signals of the comparator in each of the consecutive ones of the number of fields. The present invention utilizes more than one of the consecutive fields of the video signal to produce the single pictorial image on the liquid crystal display panel. The present invention provides simple circuitry relative to the known liquid crystal display system and also provides a stable operational margin for the liquid crystal display.

The above and other ojects, features, and advantages of the present invention will be apparent from the following detailed description of an illustrated embodiment, which is to be read in connection with the accompanying drawings, in which the same reference numerals identify the corresponding elements and parts in the several views.

DETAILED DESCRIPTION OF PREFERRED EMBODIMENTS

Figure 1:
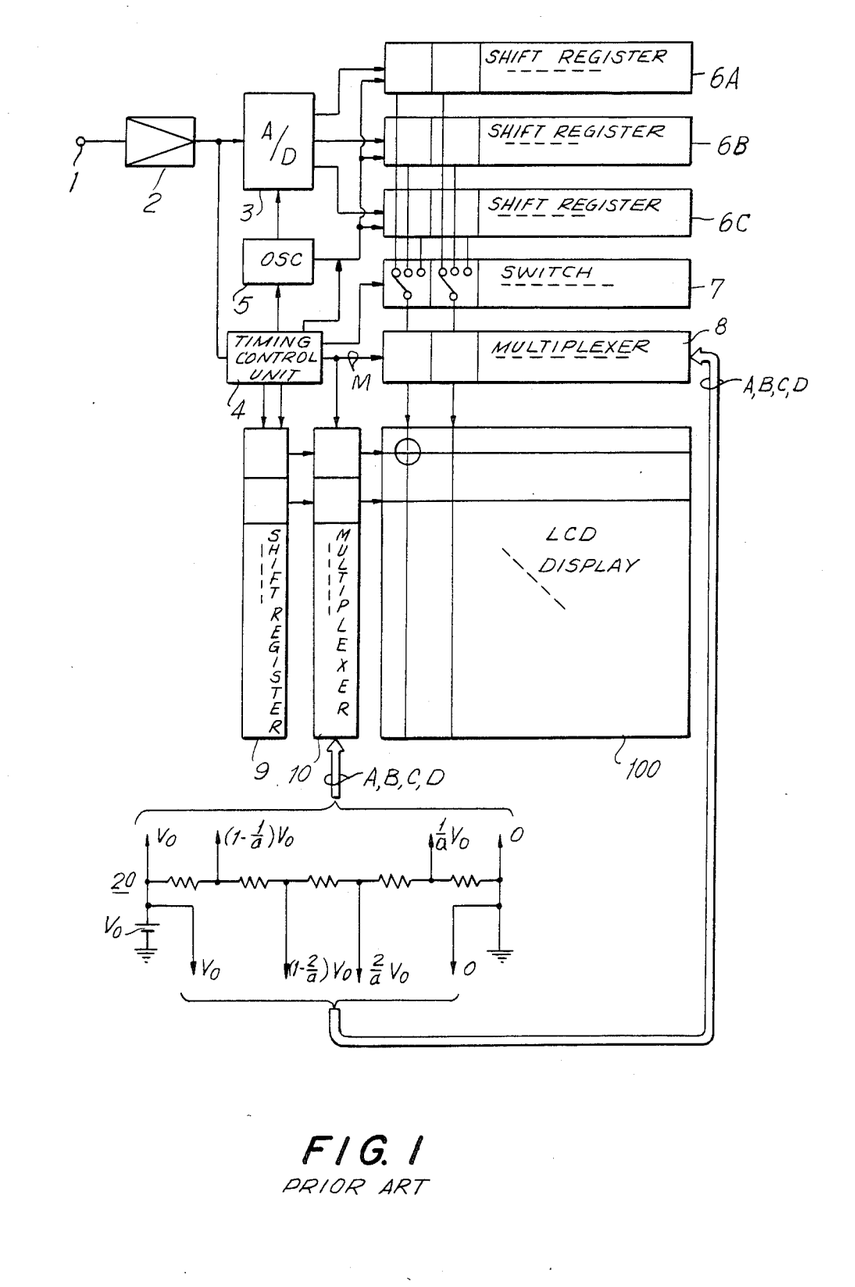
FIG. 1 is a circuit diagram of the driving circuitry for a liquid crystal display known in the prior art.
Figure 2A:
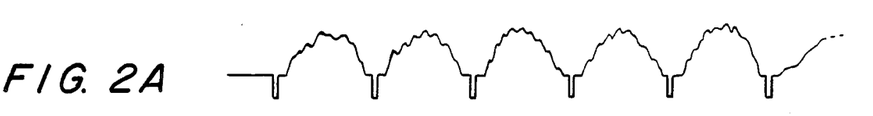
FIGS. 2A through 2J are waveforms of various signals in the circuitry of FIG. 1.

In FIG. 1 a known liquid crystal display circuit is shown that is suitable for displaying a still pictorial image having different gray shades or different gray scale levels. In FIG. 1, a typical video signal, which can be represented by the waveform of FIG. 2A, is fed to input terminal 1 of conventional video amplifier 2. The output signal from video amplifier 2 is fed to analog-to-digital converter 3, and the output signal of video amplifier 2 is also fed to timing control unit 4 that produces horizontal and vertical synchronizing pulse signals, shown in FIG. 2B and FIG. 2C, respectively. The horizontal synchronizing pulse signal is also fed to synchronizing oscillator or clock 5. In the synchronizing oscillator 5, a clock signal is generated having a number of pulses corresponding with each picture element, as represented by the waveform FIG. 2D, and is fed to a sample and hold circuit (not shown), which forms part of the output stage of analog-to-digital converter 3.

The digital output of analog-to-digital converter 3 consists of a three-bit signal that provides eight degrees of gray shade, that is, eight gray-scale levels. Each bit of the three-bit digital output signal of the analog-to-digital converter 3 is supplied to shift registers 6A, 6B, and 6C, respectively, which also receive the appropriate clock pulses from oscillator 5. Shift registers 6A, 6B, 6C also receive a latch pulse signal having a waveform as shown in FIG. 2E that is produced by timing control unit 4.

Shift registers 6A, 6B, and 6C, are each supplied with pictorial data representing one horizontal period, and that data is latched into the appropriate shift register for the next subsequent horizontal period. The digital signals that have been latched into shift registers 6A, 6B, and 6C fed to a switching circuit 7, which may be thought of as comprising a plurality of triple-pole switches. The three signals are then placed on a single output line by action of each triple-pole switch under the control of switching pulses corresponding to the weight assigned to each bit. In other words, the three positions of each switch section correspond to the weight of each bit as it appears in the three-bit binary number. This weighting is accomplished by using three different pulse widths, as seen in the waveforms of FIG. 2F, FIG. 2G, and FIG. 2H, in which each successive signal has pulses of a width that are essentially a power of two greater than the preceding one. The output signals from switch 7 are fed to analog multiplexer 8, which is the horizontal multiplexer.

Figure 2B:
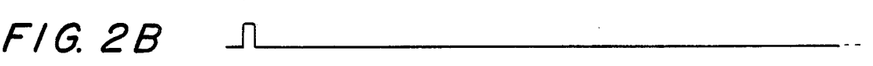
Figure 2C:
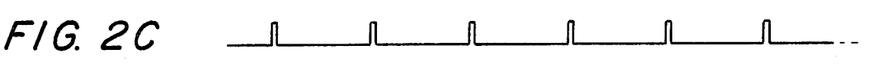
Figure 2D:
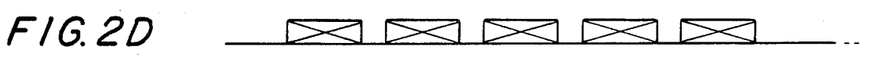
Figure 2E:
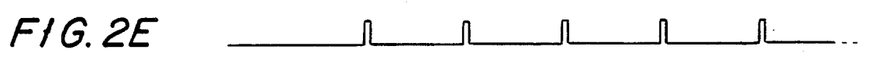
Figure 2F:
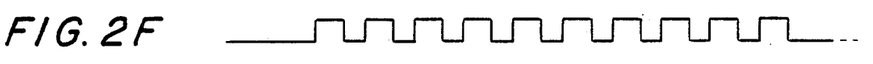
Figure 2G:
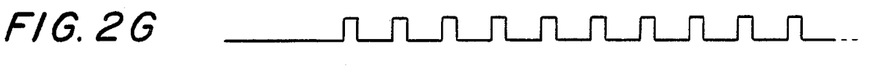
Figure 2H:
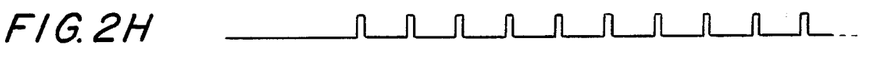
Figure 2I:
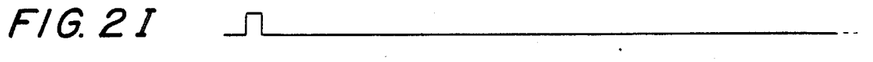

In regard to the vertical signals, scan data corresponding to vertical synchronizing pulses, as represented by the vertical sync pulses of FIG. 2C, and horizontal sync pulses, as represented by the horizontal sync pulses of FIG. 2B, are supplied by timing control unit 4 to shift register 9, which has a number of stages equal to the number of horizontal scan lines in one vertical period. In shift register 9, signals for shifting one horizontal signal at every horizontal period are formed after a vertical synchronizing pulse. The output signals from each stage of shift register 9 are then fed to analog multiplexer 10, which is substantially identical to analog multiplexer 8 used in processing the horizontal elements of the display.

Figure 3:
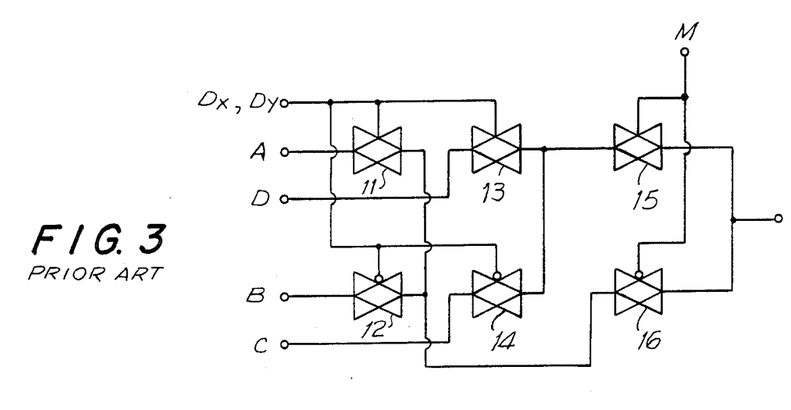
FIG. 3, is a circuit diagram of a multiplexer for use in the circuit of FIG. 1.

The construction of one stage of analog multiplexers 8 and 10 is shown in FIG. 3. Multiplexer 8 in the known circuit of FIG. 1 has as many stages as there are picture elements in one horizontal period and, similarly, in the circuit of FIG. 1, multiplexer 10 has the same number of stages as there are lines in the vertical direction.

In the multiplexer circuit of FIG. 3, analog gates 11, 12, 13, and 14 are supplied with voltages from a voltage dividing circuit, shown generally at 20 in FIG. 1. The input voltages to the four analog gates 11, 12, 13, and 14 of the multiplexer of FIG. 3 are connected respectively at four corresponding input terminals A, B, C, and D. These voltages are derived from the purely resistive voltage dividing circuit 20, as shown in FIG. 1, and the values of the resistors are chosen to provide the particular voltage relationships desired. In the case of multiplexer 8 of FIG. 1, the voltage relationships are as follows:

$A = V_0$
$B = (1-2/a)V_0$
$C = (2/a)V_0$
$D = 0$

Similarly, in the case of multiplexer 10 the voltage relationships are as follows:

$A = 0$
$B = (1-1/a) V_0$
$C = (1/a) V_0$
$D_{V0}$

The control terminals of analog gates 11 and 13 of the analog multiplexer of FIG. 3 are connected in common, as are the control terminals of gates 12 and 14. Gates 11 and 13 and gates 12 and 14 are controlled by data signal $D_x$, which is the horizontal image data as fed from switching circuit 7 in the case of multiplexer 8, or in the case of multiplexer 10 gates 11 and 13 and gates 12 and 14 are controlled by data signal $D_y$, which is the vertical data signal from shift register 9.

Figure 2J:
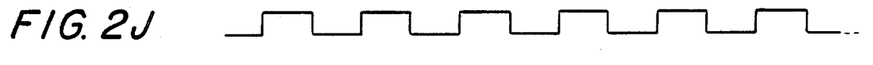

The outputs of gate circuits 11 and 12 of the analog multiplexer of FIG. 3 are tied together and connected to the input of gate circuit 16, and the outputs of gate circuits 13 and 14 are tied together and connected to the input of gate circuit 15. Gate circuits 15 and 16 are controlled by control signal M, produced by the timing control unit 4 and the waveform of this signal is shown in FIG. 2J. The outputs of gate circuits 15 and 16 are tied together and become the output signal of this one stage of the analog multiplexer shown in FIG. 3. Thus, the output signals from analog multiplexers 8 and 10 are determined by the image data signals $D_x$ and $D_y$, respectively.

Figure 4A:
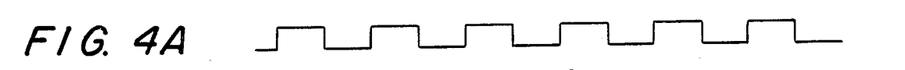
FIGS. 4A through 4D are wave forms of signals employed in the multiplexer as shown in FIG. 3A.
Figure 4B:
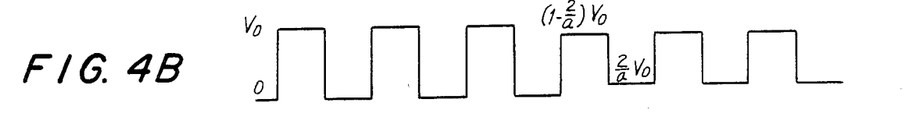
Figure 4C:
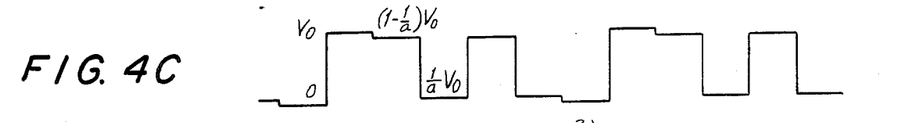
Figure 4D:
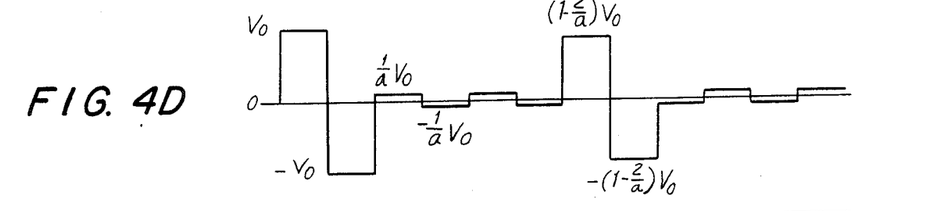
Figure 4E:
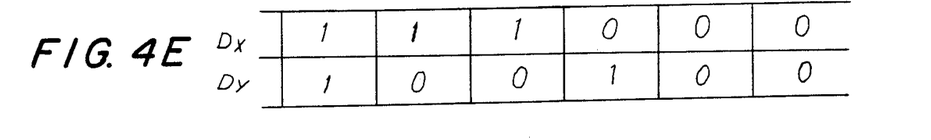
FIG. 4E is a chart, on the same time base as FIGS. 4A–4D, representing the values of data signals for use in the multiplexer of FIG. 3.

Referring to FIG. 4A, the waveform of the control clock signal M supplied from timing control circuit 4 to the control terminals of gate circuits 13 and 16 is shown. The waveforms in FIGS. 4B and 4C represent the output signals of multiplexers 8 and 10, respectively. Both output signals as shown in FIGS. 4B and 4C are supplied to signal lines or electrodes arranged in parallel both in the horizontal direction and in the vertical direction, which connect all of the picture elements of the liquid crystal display panel 100. That is, the picture elements are arranged in a matrix and one is located at each intersection of the horizontal and vertical signal lines. Thus, the voltage represented by the waveform shown in FIG. 4D is supplied across the liquid crystal display element at each intersection of a horizontal and vertical signal line, and the liquid crystal display array 100 is driven by the video signal 1 applied to terminal 1 as described above.

In this known circuit, since the control signal M for the analog multiplexers, as derived from the timing control unit, acts to invert the output signal of the multiplexers 8 and 10 as shown in FIGS. 4B and 4C, then effectively an alternating current (AC) voltage is applied across the individual liquid crystals and degradation of the liquid crystal due to electrolysis is prevented. In the prior art apparatus of FIG. 1, however, data from the switch circuits 7, as fed to multiplexer unit 8, is represented as pulse width modulated signals, so that the frequency of the signals varies according to the tone to be reproduced. The frequency f of the data signal from the switching circuit 7 may be represented as follows:

$$F = m/(T/N) \tag{1}$$

where

T: vertical period
N: number of scanning line
M: modulation rate=$T_0/t_0$
$T_0$: horizontal period
$t_0$: period when switching circuit is ON.

Thus, when $T_0$ changes in accordance with the tone of the image, the frequency f varies and causes a change in the operational margin of the liquid crystal. The result of this is that a proper tone display cannot be achieved due to the frequency characteristics of the liquid crystal.

As can be appreciated from the foregoing, this prior art circuit, as shown in FIG. 1, is quite complex and, moreover, while not shown in detail, the analog-to-digital converter 3 is also a complicated unit. Additionally, as explained above, a shift register is required for each bit of the digital output signal from the analog-to-digital converter 3 and a plurality of switching circuits are required, as determined by the number of picture elements. All of these factors result in a complex circuit that is expensive to build and whose reliability suffers due to such complexities.

Figure 5:
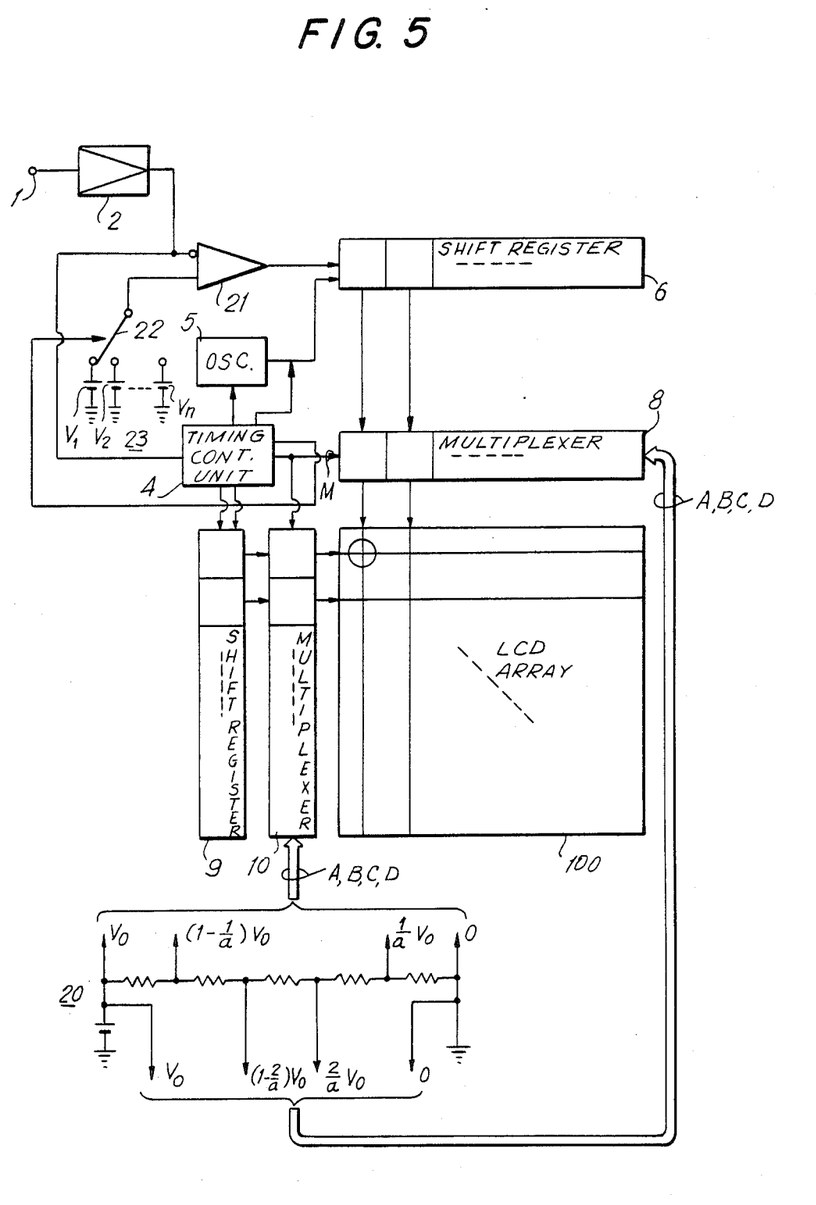
FIG. 5 is a circuit diagram of a liquid crystal display system according to the present invention.

The present invention teaches a liquid crystal display driving circuit is embodied in the circuit of FIG. 5, in which comparator 21 is provided in place of the complex analog-to-digital convertor 3 of FIG. 1. The video image signal to be displayed is again fed to input terminal 1 of video amplifier 2, and the amplified video signal is fed to one input of comparator 21. The video signal is compared with the level of the signal fed to the other terminal in comparator 21, and the present invention teaches that this reference signal should assume selected different voltage levels. The reference voltages for comparator 21 are represented as $V_1, V_2 \ldots V_n$ and are provided by a reference voltage source, shown generally at 23. The several different reference voltages $V_1, V_2, \ldots V_n$ are selectively fed to the reference input of comparator 21 through switching circuit 22. Switching circuit 22 is controlled by a control signal produced by timing control unit 4 at each field of the video signal to be displayed. The input video signal at terminal 1 is effectively sliced in comparator 21, and the slice level is changed at each field in the order $V_1, V_2, \ldots V_N$. Slicer circuits are well known and produce an output signal that is a slice of the input signal located between two reference levels. A slicer circuit can be used to convert a sinusoidal wave into a substantially square wave. The other circuit elements of FIG. 5 are the same as those shown in relation to FIG. 1. That is, timing control unit 4, synchronizing oscillator 5, multiplexers 8 and 10, shift registers 6 and 9, and voltage dividing network 20 all operate as explained above in relation to FIG. 1. Nevertheless, of particular importance is the requirement of only a single shift register 6 in place of the three registers 6A, 6B, and 6C.

Figure 6:
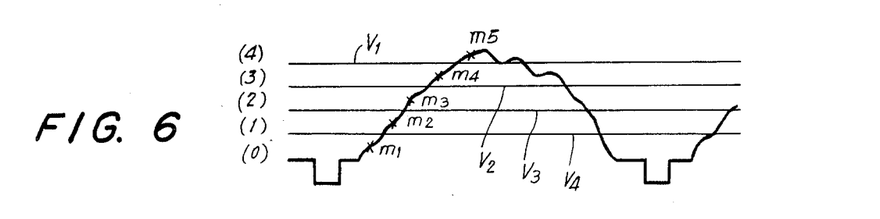
FIG. 6 is a waveform of a typical video signal showing slicing levels provided by the circuit of FIG. 5.
Figure 7A:
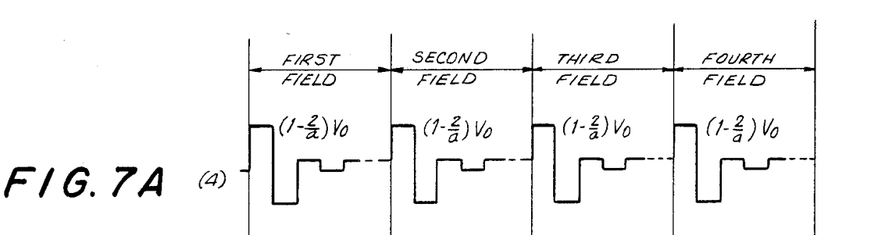
FIGS. 7A through 7E are waveforms of signals in consecutive video fields produced by the various slicing levels of the inventive circuit of FIG. 5.
Figure 7B:
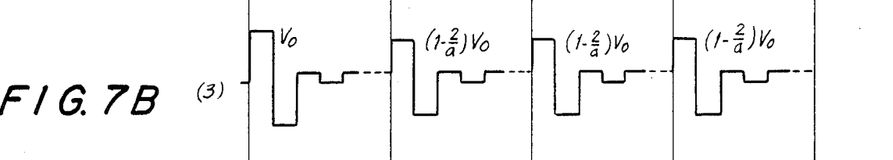
Figure 7C:
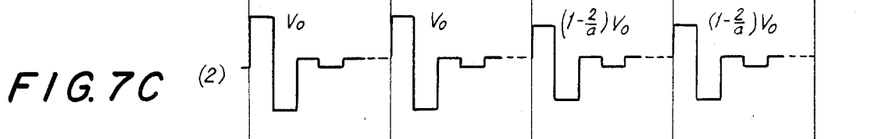
Figure 7D:
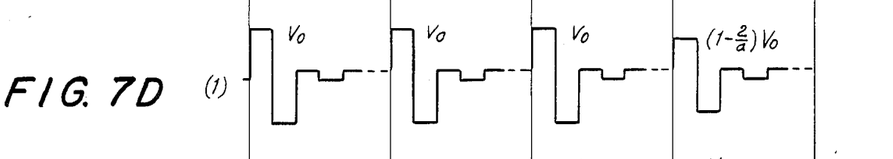
Figure 7E:
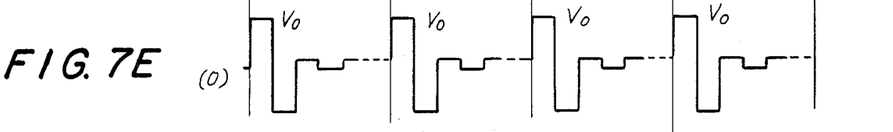

FIG. 6 represents a video signal substantially identical to that shown in FIG. 2A, with the various slice levels shown superimposed thereon. If the video signal of interest is to be displayed having five tones, represented as levels 0 through 4 in FIG. 6, then four slice levels $V_1$ through $V_4$ must be set. In the first field, the video signal is sliced by level $V_1$, in the second field the video signal is sliced by level $V_2$, and so on, until all four levels are accomplished. It is understood, of course, that such slicing is accomplished by the comparator 21 being connected to the different reference voltages. If the liquid crystal image display devices are of the reflecting kind, then black is displayed when the liquid crystal device is ON. Thus, if the level of the video signal is above the slice level then the liquid crystal is set OFF and, similarly, if the level of the video signal is below the slice level then the liquid crystal is set ON.

FIG. 7 represents the waveforms of the voltages applied across the electrodes of one picture element in four consecutive fields of the video signal. At each of the points $m_1, m_2, m_3, m_4,$ and $m_5$ of the video signal represented in FIG. 6, the voltage applied across the electrodes of one picture element is as follows, provided that the horizontal video signal of FIG. 6 does not change for the four consecutive fields. For example, at point $m_1$, since the signal is sliced in the order of $V_1, V_2, V_3$ and $V_4$ the signal applied across the electrodes of corresponding picture element becomes that as shown in FIG. 7E, and the voltage applied across the electrodes of the picture element for the point $m_2$ becomes as shown at FIG. 7D. Similarly, FIGS. 7C, 7B, and 7A, represent the voltages at points $m_3, m_4,$ and $m_5$, respectively.

If it is provided that the ON voltage is given by $\alpha V$ and the OFF voltage is given by V, where $\alpha$ represents an operational margin. Assuming that the number of scanning lines in one field is N, then becomes as follows:

$$\alpha = \sqrt{\frac{\sqrt[N]{N}+1}{\sqrt[N]{N}-1}} \tag{2}$$

Accordingly, the effective value of the supply voltage for each tone (0) through (4) in four consecutive fields is as follows:

| Tone | Effective Value | Difference |
|------|-----------------|------------|
| (4)  | $\frac{4}{4} V$ | $\frac{\alpha - 1}{4} V$ |
| (3)  | $\frac{\alpha V + 3V}{4}$ | |
| (2)  | $\frac{2\alpha V + 2V}{4}$ | $\frac{\alpha - 1}{4} V$ |
| (1)  | $\frac{3\alpha V + V}{4}$ | $\frac{\alpha - 1}{4} V$ |
| (0)  | $\frac{4\alpha}{4} V$ | $\frac{\alpha - 1}{4} V$ |

A review of the above chart indicates that the difference between the effective values of neighboring tones is the same, regardless of the tone.

According to the present invention, since the applied voltage is not pulse width modulated then the value of m in equation (1) becomes 1, thus, the frequency is constant and the operational margin of the liquid crystal display is stable. Further, the circuit is substantially simplified because there is no analog-to-digital converter required and only one shift register is required for the horizontal direction. Moreover, the complicated switching circuit 7 in FIG. 1 is not required in this embodiment of the present invention.

Furthermore, the present invention can employ elements that are known for use in conventional black and white liquid crystal displays that is, shift registers 6 and 9, analog multiplexers 8 and 10, and the liquid crystal display panel 100 can be the same as those typically used in character graphical displays in which only black or white can be displayed. Thus, the conventional character graphic display apparatus can be used in connection with the present invention. However, in the present invention, since several fields of the video picture are required to obtain one single still image the response of the display is slow. Additionally, since the response of the display is relatively slow, as described above, there is the possibility that flicker will be produced, however, the flicker is not conspicuous if one field is divided into several parts, which includes a plurality of scanning lines and the video signal is sliced at different slice levels for each portion. Thus the signal level can be changed in order or randomly.

Although a preferred embodiment of the present invention has been described above with reference to the accompanying drawings, it will be apparent that the invention is not limited to that precise embodiment and that many modifications and variations can be effected therein by one skilled in the art without departing from the spirit and scope of the invention, as defined by the appended claims.

What is claimed is:

1. A liquid crystal image display apparatus, having a liquid crystal display array with a plurality of horizontal and vertical electrodes at respective sides of the array and forming a plurality of picture elements at each electrode intersection, for displaying an image represented by a video signal including an information portion, and a synchronizing portion comprising:

comparator means, connected to receive said video signal and a reference level signal, for producing an output signal based on a comparison therebetween;

reference signal generating means for generating said reference level signal having a plurality of selected reference levels that change in response to a selected number of consecutive fields of said video signal, said reference level signals being fed to said comparator means;

means for generating first drive signals derived from said output signals of said comparator means, which are fed to said vertical electrodes for driving said liquid crystal display array; and means for generating second drive signals, derived from said synchronizing portion of said video signal, which are fed to said horizontal electrodes for driving said liquid crystal display array.

2. A liquid crystal image display apparatus according to claim 1, in which said means for generating first drive signals comprises a first shift register connected to said output signal of said comparator means for producing a plurality of parallel signals which are fed to a first multiplexer for producing said first drive signals.

3. A liquid crystal image display apparatus according to claim 2, in which said first multiplexer comprises a plurality of analog gates connected to receive said parallel output signals from said first shift register and means for generating a plurality of voltages fed to said analog gates for determining the relative voltage levels of the first drive signals applied to said liquid crystal display array.

4. A liquid crystal image display apparatus according to claim 3, in which said means for generating said plurality of voltages which are fed to said first multiplexer includes a voltage dividing network.

5. A liquid crystal image display apparatus according to claim 1, in which said means for generating said second drive signals comprises a second shift register connected to receive said synchronizing portion of said video signal for producing a plurality of parallel signals which are fed to a second multiplexer for producing said second drive signals.

6. A liquid crystal image display apparatus according to claim 5, in which said second multiplexer comprises a plurality of analog gates connected to receive said parallel output signals from said second shift register and means for generating a plurality of voltages fed to said analog gates for determining the relative voltage levels of the second drive signals applied to said liquid crystal display array.

7. A liquid crystal image display apparatus according to claim 6, in which said means for generating said plurality of voltages which are fed to said second multiplexer includes a voltage dividing network.

8. A liquid crystal image display apparatus according to claim 1, in which said synchronizing signals comprise a vertical synchronization signal and a horizontal synchronization signal, and further including a timing control unit connected to receive said vertical and horizontal synchronization signals for deriving timing signals which are fed to said means for generating first drive signals and to said means for generating second drive signals.

9. A liquid crystal display apparatus for displaying a still image, derived from a video signal including an information portion and vertical and horizontal synchronization portions, on a liquid crystal display panel formed of a plurality of liquid crystal display devices arranged in an array with a plurality of horizontal and vertical electrodes having intersections at the respective display devices, comprising:

comparator means connected to receive said information portion of said video signal for comparing said information portion with a reference signal and producing a corresponding output signal;

means for producing said reference signal which is fed to said comparator means, having a plurality of reference voltage levels that change in every field of a group of consecutive fields of said video signal;

means connected to receive the output signal of said comparator means for generating first drive signals and for supplying said first drive signals to said vertical electrodes of said liquid crystal display array; and means for generating second drive signals in response to said vertical and horizontal synchronization portions in said video signal and for supplying said second drive signals to said horizontal electrodes for driving said liquid crystal display array.

10. A liquid crystal image display apparatus according to claim 9, in which said means for producing said reference signal includes a plurality of respective voltage sources and a switch for selectively connecting said plurality of voltage sources to said comparator means.

11. A liquid crystal image display apparatus according to claim 9, in which said means for generating first drive signals comprises a first shift register, connected to receive said output signal from said comparator means, for producing a plurality of parallel signals which are outputted to a first multiplexer means for supplying said first drive signals to said vertical line electrodes.

12. A liquid crystal image display apparatus according to claim 11, in which said means for generating said first drive signals further comprises a voltage divider network for producing a plurality of voltage levels which are fed to said first multiplexer for determining respective voltage levels of said first drive signals.

13. A liquid crystal image display apparatus according to claim 9, in which said means for generating second drive signals comprises a second shift register connected to receive said vertical and horizontal synchronization portions of said video signal for producing a plurality of parallel output signals which are fed to a second multiplexer for supplying said second drive signals to said horizontal electrodes to drive said liquid crystal display array.

14. A liquid crystal image display apparatus according to claim 13, in which said means for generating said second drive signals includes a voltage divider network for producing a plurality of voltage levels which are fed to said second multiplexer for determining respective voltage levels of said second drive signals.

15. A liquid crystal image display apparatus according to claim 9, further comprising a timing control unit connected to receive said vertical and horizontal synchronization portions of said video signal for producing timing signals and control signals which are fed to said means for generating first drive signals and to said means for generating second drive signals for controlling the timing thereof.

16. A liquid crystal display apparatus for displaying an image, derived from an information portion of a video signal that includes vertical and horizontal synchronization signals, on a liquid crystal display array having a plurality of horizontal and vertical electrodes provided at respective sides of the array and forming a plurality of picture elements at each intersection of said electrodes, comprising:

comparator means connected to receive said video signal for comparing said information of said signal with a reference signal;

reference voltage signal generator means for producing said reference signal with a plurality of reference voltage levels which change in every field of a selected group of consecutive fields of said video signal;

means for generating first drive signals and which is connected to receive said output signal from said comparator means and for supplying said first drive signals to said vertical line electrodes of said liquid crystal display panel; and means for generating second drive signals and which is connected to receive said video signal for producing said second drive signals in accordance with said vertical and horizontal synchronization signals contained within said video signal and for supplying said second drive signals to said horizontal electrodes for driving said liquid crystal display panel.

17. A liquid crystal display apparatus according to claim 16, further comprising timing control means connected to receive said video signal for producing timing control signals which are fed to said means for generating said first drive signals and to said means for generating said second drive signals for controlling the relative timing of said first and second drive signals.

18. A liquid crystal display apparatus according to claim 16, in which said reference voltage signal generator means comprises a plurality of voltage sources and a switch for producing five different voltage levels forming said reference level signal which is fed to said comparator means.

19. A liquid crystal display apparatus according to claim 16, in which said means for generating first drive signals includes a first shift register connected to receive said output signal from said comparator means for producing a plurality of parallel signals which are fed to a first multiplexer for producing said first drive signals which are connected to said vertical line electrodes of said liquid crystal display array.

20. A liquid crystal display apparatus according to claim 19, in which said means for generating said second drive signals includes a second shift register connected to receive said video signal for producing a plurality of parallel output signals which are fed to a second multiplexer for supplying said second drive signals to said horizontal electrodes of said liquid crystal display array.

* * * * *